United States Patent [19]

Kato et al.

[11] 4,425,899

[45] Jan. 17, 1984

[54] INTAKE HEATING DEVICE OF AN INTERNAL COMBUSTION ENGINE

[75] Inventors: Keigo Kato; Yoshio Kuroiwa, both of Toyota, Japan

[73] Assignee: Toyota Jidosha Kogyo Kabushiki Kaisha, Toyota, Japan

[21] Appl. No.: 386,604

[22] Filed: Jun. 9, 1982

[30] Foreign Application Priority Data

Mar. 2, 1982 [JP] Japan ................................. 57-31673

[51] Int. Cl.³ ........................................... F02M 31/00
[52] U.S. Cl. .................................... 123/549; 123/552; 123/545; 261/142; 219/207
[58] Field of Search ................ 123/549, 552; 219/205, 219/206, 207, 307, 374, 375, 376, 381, 382, 505; 261/142

[56] References Cited

U.S. PATENT DOCUMENTS

| | | | |
|---|---|---|---|
| 1,472,233 | 10/1923 | Taylor | 123/549 |
| 4,108,953 | 8/1978 | Rocco | 123/549 |
| 4,327,697 | 5/1982 | Wada | 123/549 |
| 4,361,125 | 11/1982 | Igashira | 123/549 |
| 4,362,142 | 12/1982 | Igashira | 123/549 |
| 4,377,148 | 3/1983 | Ishida | 123/549 |
| 4,390,000 | 6/1983 | Igashira | 123/549 |

*Primary Examiner*—Ronald H. Lazarus
*Attorney, Agent, or Firm*—Kenyon & Kenyon

[57] ABSTRACT

The present invention proposes an intake heating device of an internal combustion engine. The intake heating device has a hollow heater vessel comprising an inner pipe and an outer pipe between which an enclosed area is defined. For heating the inner pipe, a plurality of PTC elements are disposed in said enclosed area. The protection of the PTC elements from water, oil and the like is accomplished by coupling the inner and outer pipes hermetically and by embedding the lead members for applying voltage to PTC elements integrally in the outer pipe wall when it is being cast. For maintaining the fundamental function of the PTC elements, at least one of the lead members embedded in the pipe wall is formed in a tubular shape along which a through hole can be provided for allowing a certain amount of air to flow into said enclosed area.

5 Claims, 19 Drawing Figures

INTAKE HEATING DEVICE OF AN INTERNAL COMBUSTION ENGINE

BACKGROUND OF THE INVENTION

The present invention relates to an apparatus for promoting the vaporization of liquid fuel in an internal combustion engine.

The low engine temperature before completion of the engine warm-up results in insufficient vaporization of the fuel supplied from the carbureter. The supply of a large quantity of fuel into the engine cylinders in the liquid state results in poorer combustion than after completion of the warm-up, so that a stable operation of the engine cannot be obtained. Accordingly, during the warm-up, an air-fuel mixture, which is richer than the air-fuel mixture used after completion of the warm-up, is supplied into the engine cylinders so as to maintain a stable engine operation. However, the supply of such a richer air-fuel mixture to the engine cylinders causes not only an increase in the amount of poisonous components, such as unburnt hydrocarbons HC and carbon monoxide gas CO in the exhaust, but also an increase in the fuel consumption. Accordingly, sufficient vaporization of the liquid fuel supplied from the carbureter during the engine warm-up would enable a stable engine operation, even with a reduced air-fuel mixture. The use of such a reduced air-fuel mixture would allow the control of the formation of poisonous components in the exhaust gas and the reduction of the fuel consumed. We previously proposed an intake heating apparatus for promoting vaporization of a liquid fuel during the engine warm-up, which comprises a hollow heating element vessel attached to, for example, the outlet portion of a carbureter air horn, said hollow heating element vessel including an inner pipe, an outer pipe, and a plurality of positive temperature coefficient thermistors (hereinafter referred to as "PTC elements") inserted between the inner and outer pipes, wherein the inner pipe of the hollow heating element vessel is heated by heating the PTC elements (c.f. Japanese patent application Nos. 55-169050 and 56-157536.)

In such an intake heating device utilizing PTC elements, it is necessary that the intrusion of various materials, such as fuel, oil, water, dust or the like, be prevented. On the other hand, PTC elements themselves always need fresh air in order to maintain their fundamental function; otherwise, the life of the PTC elements will be shortened due to changes of the characteristic curve.

SUMMARY OF THE INVENTION

It is an object of the invention to provide an intake heating device of an internal combustion engine, which can be enclosed in order to prevent the undesirable intrusion of various materials, but which will allow the introduction of a certain amount of fresh air.

The present invention provides for an intake heating device of an internal combustion engine, which has a hollow heater vessel placed in an intake passage between the fuel supply means and a cylinder of the engine, said hollow heater vessel comprising an inner pipe having therein a mixture passage which is aligned with the intake passage, an outer pipe radially spaced from and surrounding said inner pipe, said inner and said outer pipes being coupled to each other so as to define an enclosed area therebetween, a plurality of PTC elements inserted in said enclosed area between said inner and said outer pipes, and power supply means for applying voltage between the inner walls and the outer walls of said PTC elements, said power supply means comprising lead members which extend across the wall of said outer pipe, wherein the improvement comprises: said lead members being embedded integrally in said outer pipe in the course of the outer pipe casting; and at least one of said lead members being formed in a tubular shape which extends across the whole or a part of said outer pipe wall and along which a through hole can be provided for flowing a certain amount of air into said enclosed area.

The present invention may be more fully understood from the description of a preferred embodiment of the invention set forth below, together with the accompanying drawings.

DESCRIPTION OF A PREFERRED EMBODIMENT

A basic arrangement of an intake heating device of an internal combustion engine is firstly described, referring to FIGS. 1 through 9, which are based on Japanese Patent Application No. 56-157536. The present invention relates to an improvement of the intake heating device of this type.

Figure 1:
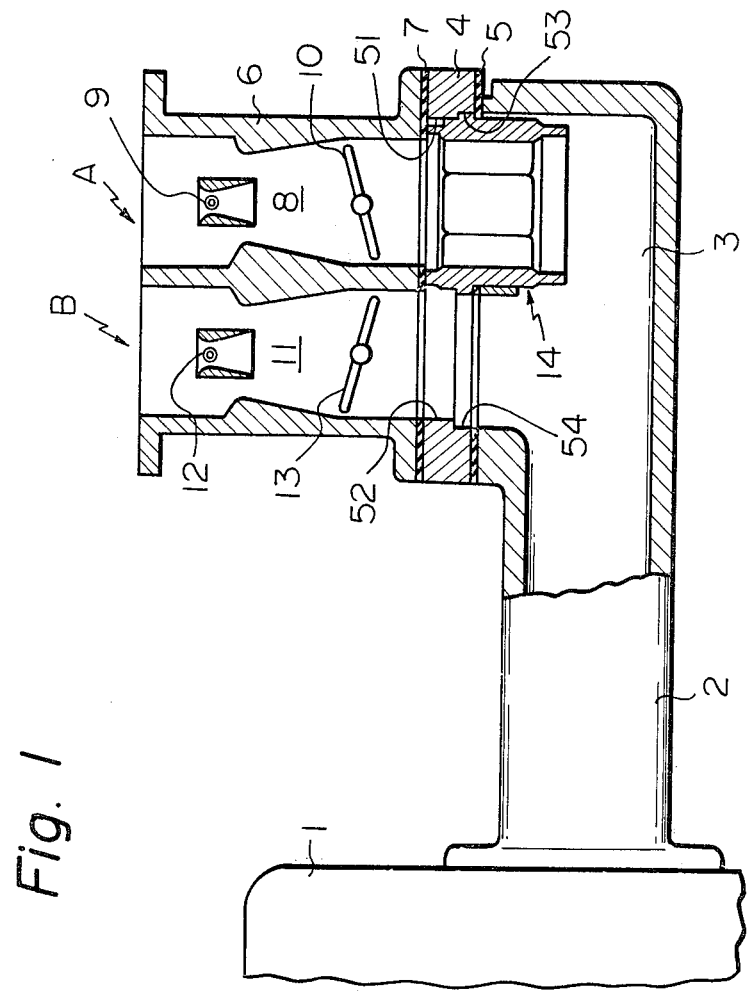
FIG. 1 is a sectional side view of the intake system of an engine according to the present invention.
Figure 2:
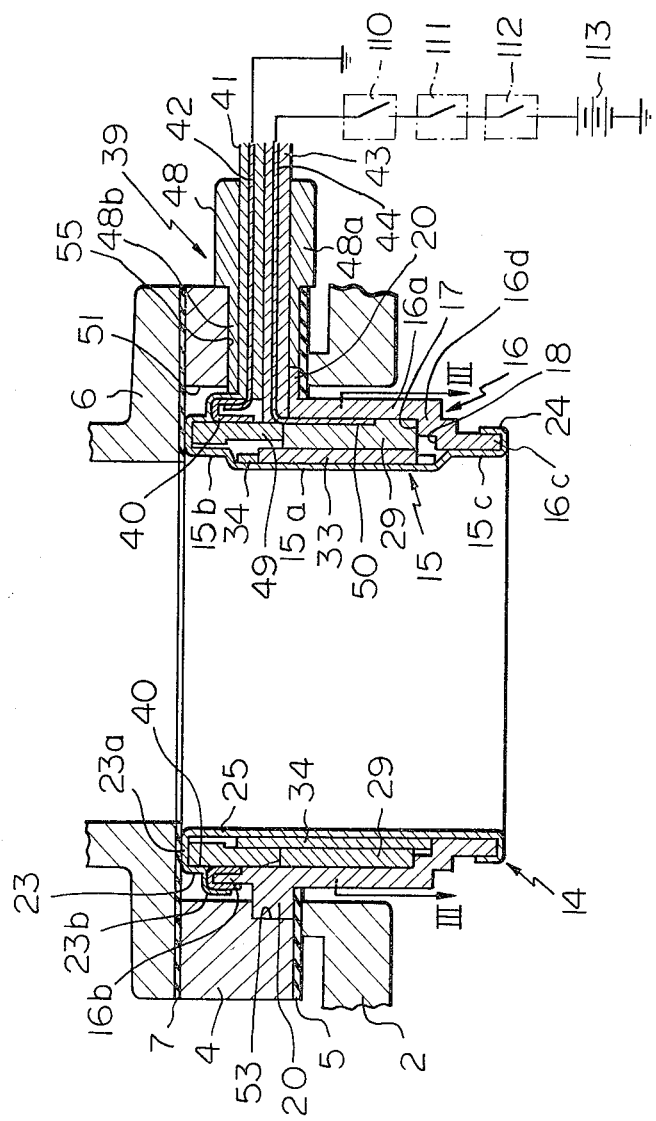
FIG. 2 is a cross-sectional side view of the heating element vessel, taken along the line II—II in FIG. 3.
Figure 3:
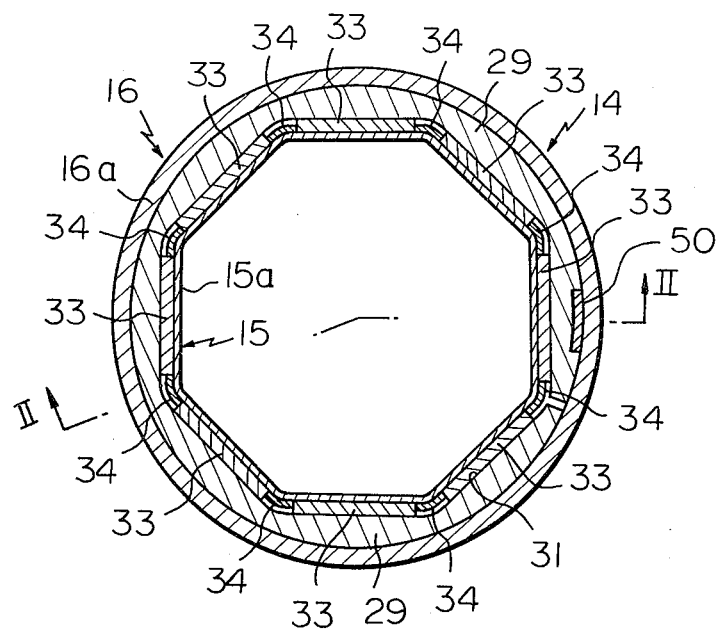
FIG. 3 is a cross-sectional plan view taken along the line III—III in FIG. 2.
Figure 4:
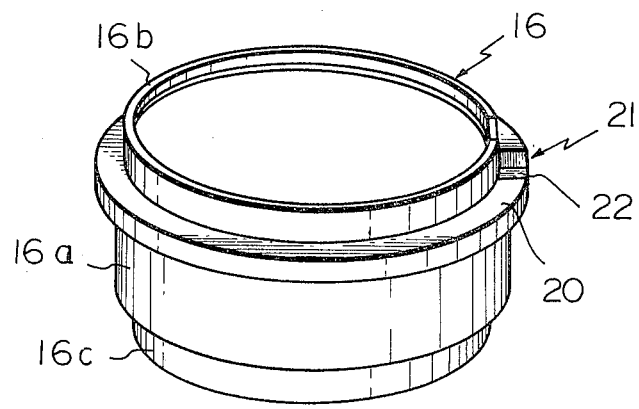
FIG. 4 is a perspective view of the outer pipe.

In FIG. 1, reference numerals 1, 2, 3, 4, and 6 designate an engine body, an intake manifold, a collecting portion of the intake manifold 2, a heat-insulating plate of a plastic material attached onto the collecting portion 3 via a gasket 5, and a carbureter secured to the heat-insulating plate 4 via a gasket 7, respectively. This carbureter 6 has a primary carbureter A and a secondary carbureter B. The primary carbureter A is provided with a primary air horn 8, a primary main nozzle 9, and a primary throttle valve 10, and the secondary carbureter B is provided with a secondary air horn 11, a secondary main nozzle 12, and a secondary throttle valve 13. As shown in FIG. 1, a hollow heating element vessel 14 is placed in the heat insulating plate 4 in the lower end portion of the primary carbureter A in alignment with the primary air horn 8 and is projected into the collecting portion 3. As shown in FIGS. 2 and 3, this hollow heating element vessel 14 comprises an inner pipe 15 composed of a thin metallic material and an outer pipe 16 composed of a thin plastic material. As illustrated in FIG. 4, the outer pipe 16 has an intermediate portion 16a having a uniform inner diameter, a top end portion 16b having an inner diameter slightly larger than the inner diameter of the intermediate portion 16a, and a lower end portion 16c having an inner diameter smaller than the inner diameter of the intermediate portion 16a. The thickness of the top end portion 16b is slightly less than that of the intermediate portion 16a, and the thickness of the lower end portion 16c is substantially equal to the thickness of the intermediate portion 16a. An inwardly descending step portion 16d is formed between the intermediate portion 16a and the lower end portion 16c, and this step portion 16d comprises a first annular shoulder 17 extending in the radial direction, a second annular shoulder 18 extending in the radial direction and located below the first annular shoulder 17. An annular flange 20 having a rectangular section is integrally formed on the back surface of the intermediate portion 16a at a position adjacent to the top end portion 16b. Furthermore, a cut-away portion 21 extending from the top end portion 16b into the flange 20 is formed on the outer pipe 16, and a flat face extending in the radial direction is formed on the bottom 22 of the cutaway portion 21. As described hereinbefore, this outer pipe 16 is integrally molded from a plastic material 16, but the outer pipe 16 may also be formed from a metallic material.

Figure 5:
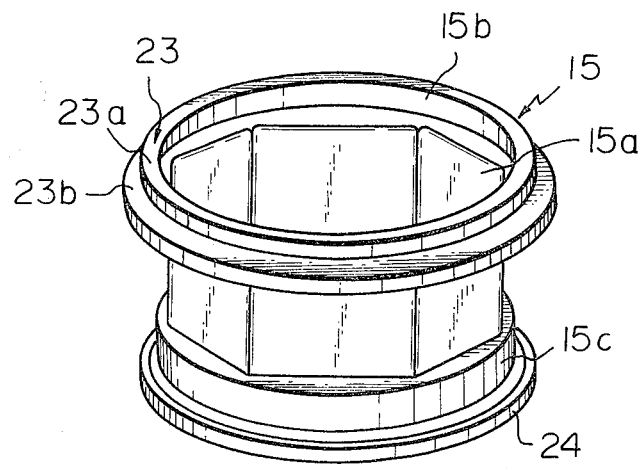
FIG. 5 is a perspective view of the inner pipe.

As shown in FIGS. 2, 3 and 5, the inner pipe 15 has an intermediate portion 15a having an octahedral section, a cylindrical top end portion 15b and a cylindrical lower end portion 15c. The inner diameter of the cylindrical top end portion 15b is the same as the inner diameter of the cylindrical lower end portion 15c, and the intermediate portion 15a as a whole expands inwardly from the cylindrical upper end portion 15b and cylindrical lower end portion 15c. A step-like flange 23 extending outwardly is integrally formed on the top end of the cylindrical top end portion 15b. This step-like flange 23 comprises an inner flange 23a having an L-shaped section and extending outwardly beyond the top end of the cylindrical upper end portion 15b and an outer flange 23b having an L-shaped section and extending outwardly beyond the tip of the inner flange 23a. Furthermore, a flange 24 having an L-shaped section and extending outwardly is integrally formed on the top end of the cylindrical lower end portion 15c, and, as shown in FIG. 2, this flange 24 is fitted onto the lower end portion 16c of the outer pipe 16.

As shown in FIG. 2, an insulating ring 25 composed of a heat-resistant fluorine resin, such as polytetrafluoroethylene, or a heat-resistant rubber, such as a silicone rubber, in inserted between the inner pipe 15 and the outer pipe 16, and this insulating ring 25 is fitted in the inner flange 23a of the inner pipe 15.

Figure 6:
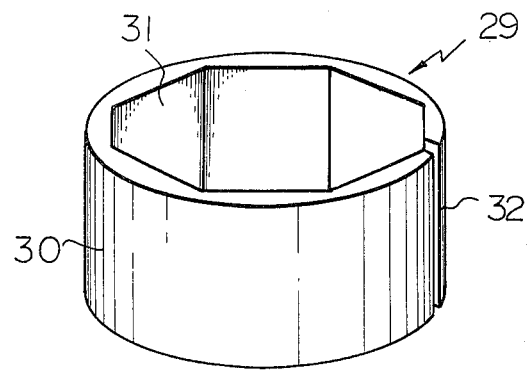
FIG. 6 is a perspective view of the elastic electrode.

As shown in FIGS. 2 and 3, an annulr elastic electrode 29 composed of graphite is inserted between the inner pipe 15 and the outer pipe 16. As shown in FIG. 6, this elastic electrode 29 has a cylindrical peripheral face 30 and an inner circumferential face 31 having an octahedral section, and is separated by a slit 32 extending in the axial direction. As seen from FIG. 3, the elastic electrode 29 is inserted between the inner and outer pipes 15 and 16 so that respective flat faces constituting the octahedron of the inner circumferential face 31 of the elastic electrode 29 confront the corresponding flat faces constituting the octahedron of the inner pipe 15. Furthermore, the length of this elastic electrode 29 is shorter than the length of the intermediate portion 15a of the inner pipe 15 and the elastic electrode 29 is arranged in the region of this intermediate portion 15a of the inner pipe 15.

Figure 7:
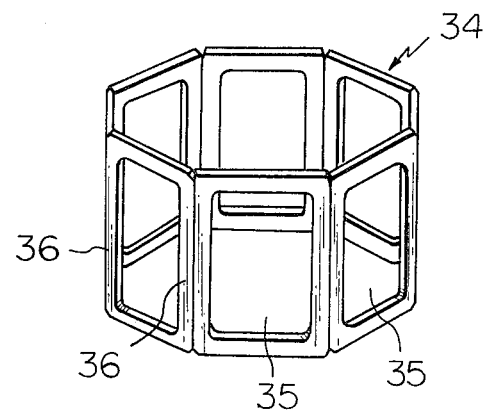
FIG. 7 is a perspective view of the insulating member at the time of insertion.
Figure 8:
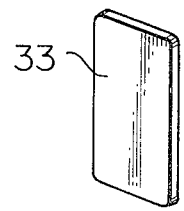
FIG. 8 is a perspective view of the PTC element.

A PTC element 33 is inserted into each of the gaps between the flat faces of the peripheral face of the intermediate portion 15a of the inner pipe 15 and the elastic electrode 29, and, furthermore, an insulating member 34 having a thickness smaller than that of each PTC element 33 is inserted to surround the peripheral walls of said PTC elements 33. As shown in FIG. 7, the insulating member 34 is composed of belt-like asbestos (made into a circle) and eight holes 35 are equidistantly formed on the insulating member 34. As shown in FIG. 8, each PTC element has a rectangular plate-like shape, and the holes 35 of the insulating member 34 have a contour substantially the same as that of the PTC elements 33. The holes 35 are separated from one another by ribs 36 arranged equidistantly. Incidentally, the respective flat faces constituting the octahedron of the insulating member 34 are arranged on the corresponding flat faces constituting the octahedron of the inner pipe 15, and the PTC elements 33 are inserted into the corresponding holes 35 of the insulating member 34.

Figure 9:
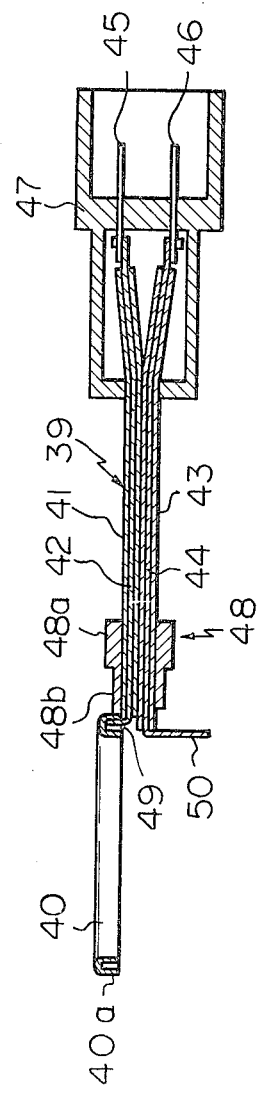
FIG. 9 is a cross-sectional side view of the electrode unit.

An electrode unit 39 extending outwardly in the radial direction is attached to the upper end portion of the hollow heating element vessel 14. This electrode unit 39 comprises, as shown in FIG. 9, a metal ring 40 having a U-shaped section, a band-like negative side lead 42 covered with an insulating tube 41, a band-like positive side lead 44 covered with an insulating tube 43, and a connector 47 provided with a pair of terminals 45 and 46. The insulating tubes 41 and 43 are overlapped together and a retainer 48 formed of a rubber material is inserted on the peripheries of the overlapped tubes 41 and 43.

As shown in FIG. 9, the inner end 49 of the negative side lead 42 is upwardly bent at a right angle, and the bent inner end 49 is welded in the U-shaped section of the ring 40. The outer end of the negative side lead 42 is connected to the terminal 45 of the connector 47. The inner end 50 of the positive side lead 44 is downwardly bent in the direction opposite to the bending direction of the bent inner end portion 49 of the negative side lead 42, and the outer end of the positive side lead 44 is connected to the terminal 46 of the connector 47. As shown in FIG. 2, the U-shaped section of the ring 40 is fitted in the top end portion 16b of the outer pipe 16, and the outer flange 23b of the inner pipe 15 is fitted onto the ring 40. The bent inner end 50 of the positive side lead 44 is inserted between the intermediate portion 16a of the outer pipe 16 and the elastic electrode 29.

As shown in FIG. 1, a large-diameter hole 51 and a small-diameter hole 52, which are connected to each other, are formed on the heat insulating plate 4, and the hollow heating element vessel 14 is placed in the large-diameter hole 51. The small-diameter hole 52 is arranged in alignment with the secondary air horn 11. Grooves 53 and 54 having an L-shaped section are formed along the entire length of the lower side portion of the inner circumferential wall face of the heat insulating plate 4 defining the large-diameter hole 51 and small-diameter hole 42, and the flange 20 integrally formed on the peripheral wall face of the outer pipe 16 is fitted in the groove 53 of the large-diameter hole 51. Further, a dovetail groove 55 is formed on the lower side wall face of the heat insulating plate 4, and the inner side portion 48b of the retainer 48, having a trapezoidal section, is fitted in this dovetail groove 55.

As shown in FIG. 2, the negative side lead 42 is earthed and the positive side lead 44 is connected to a power source 113 through a temperature detecting switch 110, a neutral point voltage detecting switch 111, and an ignition switch 112. The temperature detecting switch 110 is turned on when the temperature of the engine cooling water is lower than, for example, 60° C., and it is turned off when the temperature of engine cooling water exceeds 60° C. The neutral point voltage detecting switch 111 is turned off when the neutral point voltage of the engine-driven alternator is lower than a predetermined level, and is turned on when this neutral point voltage exceeds the predetermined level.

Since a large current flows at the time of starting the supply of the electric current, it is necessary that the supply of the electric current to the PTC element 33 should not be started while the starter motor is actuated to start the engine. A neutral point voltage detecting switch 111 is equipped for this purpose. More specifically, when the engine is rotated by the starter motor, the neutral point voltage is low, and when the engine is rotated by its own power, the neutral point voltage is increased, the neutral point voltage detecting switch is turned on, and the supply of the electric current to the PTC element 33 is started. When the supply of the electric current to the PTC element 33 is thus started, the temperature of the PTC element is immediately elevated and, therefore, the temperature of the inner pipe 15 is immediately elevated.

When the engine is started, the majority of the liquid fuel supplied from the primary carbureter A flows down along the inner wall face of the primary air horn 8. This liquid fuel flows down along the inner wall face of the inner pipe 15. The outer pipe 16 is formed of a heat insulating material and is supported by the heat insulating plate 4. Accordingly, only a very small proportion of heat generated by the PTC element 33 escapes to the intake manifold 2 and the carbureter 6. The majority of heat generated by the PTC element 33 is used for heating the inner pipe 15. Since the inner wall face of the inner pipe 15 is covered with the liquid fuel, the majority of heat generated by the PTC element 33 is used for vaporizing the liquid fuel. Furthermore, since the intermediate portion 15a of the inner pipe 15 expands inwardly from the top end portion 15b of the inner pipe 15, adhesion of fuel drops floating in the air-fuel mixture to the intermdiate portion 15a of the inner pipe 15 is accelerated, and vaporization of the fuel is further promoted.

When a certain time has passed from the point of starting the engine and the temperature of the engine cooling water exceeds 60° C., the temperature detecting switch 110 is turned off to stop the supply of the electric current to the PTC element 33.

Moreover, as is well known, graphite has a directional property in heat conductivity, and heat conductivity in the radial direction is lower than heat conductivity in the circumferential direction. Accordingly, heat is not smoothly conducted in the radial direction in graphite, and, hence, the elastic electrode 29 exerts a heat insulating action. Furthermore, as pointed out hereinbefore, the outer pipe 16 is formed of a heat insulating material, and the elastic electrode 29 has a heat insulating action. Therefore, the majority of heat generated by the PTC elements can be used for heating the inner pipe 15. Still further, since heat is smoothly conducted in the circumferential direction in graphite, the inner pipe 15 can be heated uniformly.

As will be apparent from the foregoing description, one need only bend the upper and lower end portions of the inner pipe onto the upper and lower end portions of the outer pipe to couple the inner pipe to the outer pipe. Accordingly, coupling of the inner pipe with the outer pipe can be accomplished very easily. Furthermore, no additional space is necessary for this coupling. Therefore, the size of the heating element vessel can be reduced, and intrusion of fuel, rain water, or the like into enclosed area between the inner and outer pipes can be completely prevented.

The above described intake heating device of an internal combustion engine is further improved. It is advantageous that if the band-like negative side lead 42 and the band-like positive side lead 44, shown in FIG. 2, are made of high electric conductive material plates and if the plate leads are embedded integrally in the outer pipe 16 in the course of the outer pipe casting process, the assembling work and the number of parts of the intake heating device can be considerably reduced and complete hermetic sealing of the enclosed area can be established. It is further advantageous that the negative side lead plate 42 and the metal ring 40 having a U-shaped section be joined together prior to the above-described embedding procedure in the outer pipe 16 so that the assembly work can take place more easily. With this aspect, an improved intake heating device is described below in detail.

Figure 13:
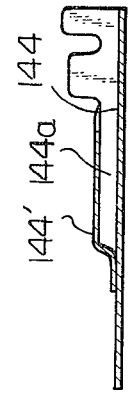
FIGS. 12 and 13 are a top plan view and a sectional view, respectively, of the positive lead in FIG. 11.
Figure 12:
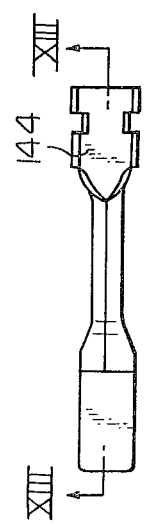
Figure 10:
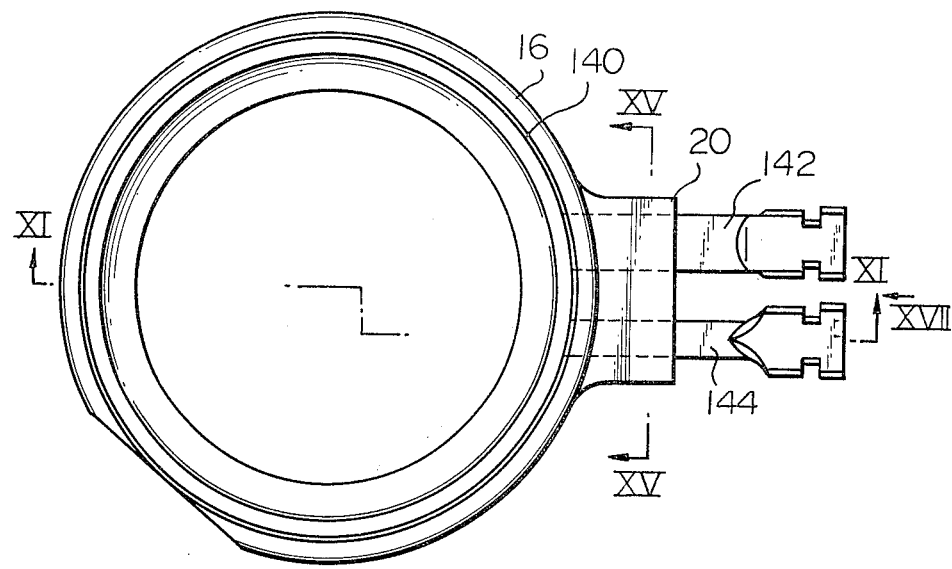
FIG. 10 is a plan view of the outer pipe, according to the present invention, with the negative and positive leads embedded therein.
Figure 11:
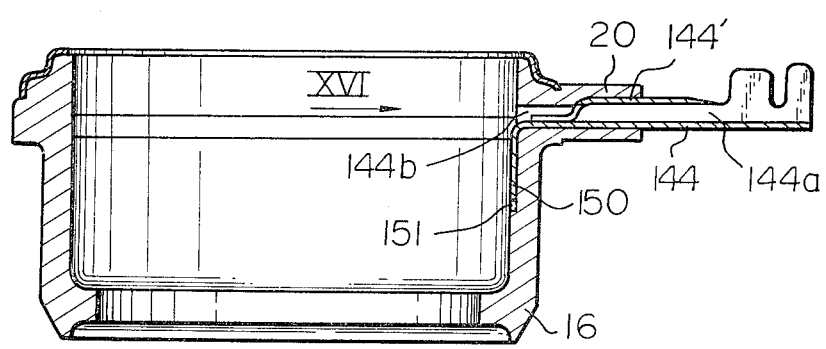
FIG. 11 is a longitudinal sectional view of the outer pipe, taken along the line XI—XI in FIG. 10.

FIGS. 10 and 11 show a preferred embodiment of an outer pipe 16, a negative side lead plate 142 and a positive side lead plate 144, with both lead plates embedded radially across the outer pipe 16 at the flange 20. These lead plates are placed side by side horizontally, differing from the above described arrangement in FIG. 9. The negative lead plate 142 is upwardly bent inside the outer pipe 16 and joined to the ring 140, though the detail of the negative side lead is not shown in FIGS. 10 and 11, but is apparent from the foregoing description. The positive lead plate 144 is downwardly bent inside the outer pipe 16 and the bent inner end 150 of the positive lead plate 144 is connected to the above described elastic electrode 29. This positive lead plate 144 is formed in a tubular shape 144' at least the area where the flange 20 of the outer pipe extends. This positive lead plate 144 is shown in FIGS. 12 and 13. FIG. 11 shows that after the positive lead 144 having the tubular section 144' has been embedded in the outer pipe 16, a hole 144b is drilled in the outer pipe 16 along a hole 144a of the tubular section 144' in such a manner that the size of the hole 144b is approximately equal to that of the hole 144a of the tubular section 144' and the two holes 144a and 144b communicate with each other. Therefore, fresh air can flow to the enclosed area in the hollow heater vessel 14 only through the holes 144a and 144b.

Figure 14:
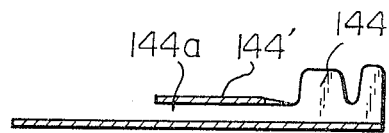
FIG. 14 is a sectional view of another example of the positive lead.

Another example of the positive lead plate 144 is shown in FIG. 14, wherein the tubular section 144' extends to the inner surface of the outer pipe 16 and the inner end of the tubular section 144' is open. With this arrangement, there is no need of drilling the hole 144b. In the case where the inner open end of the tubular section 144' does not reach the inner surface of the outer pipe 16, a pin (not shown) may be inserted in the hole 144a during the molding procedure of the outer pipe 16 when the positive lead is embedded therein, and after completion of the molding the pin is withdrawn from the outer pipe 16 so as to provide a through hole. Therefore, it is apparent that there is no need of extending the turbular section 144' to the inner surface of the outer pipe wall, if the outer end of the tubular section 144' extends outside the flange 20. The length of the tubular section can be selected depending on the manufacturing conditions of the outer pipe.

Figure 15:
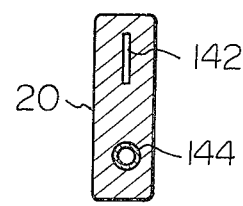
FIG. 15 is a sectional view of the outer pipe, taken along the line XV—XV in FIG. 10.
Figure 16:
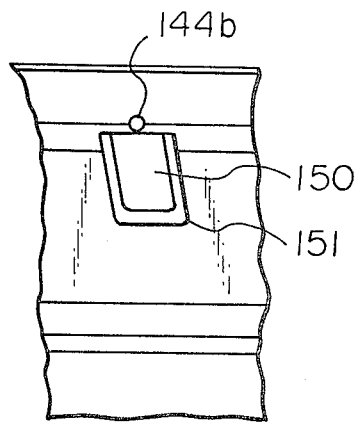
FIG. 16 is a side elevational view of the outer pipe, taken along the arrow XVI in FIG. 11.
Figure 17:
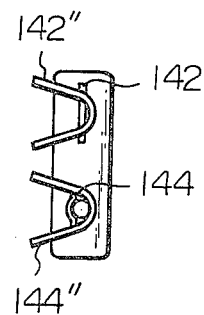
FIG. 17 is an end view of the lead plates taken along the arrow XVII in FIG. 10.

FIG. 15 is a section of the outer pipe 16, taken along the line XV—XV in FIG. 10, and shows that the negative lead plate 142 has a plate-like form and the positive lead 144 is tubular. FIG. 16 is a side elevational view of the outer pipe 16, taken along the arrow XVI in FIG. 11, and shows that the hole 144b is open above the inner bent end 150 of the positive lead plate 144. As described hereinbefore, the positive lead plate 144 is straight when it is embedded in the outer pipe 16 during casting, as shown in FIGS. 12 through 14, but subsequently it is bent downward and accommodated in the cavity 151 of the inner wall of the outer pipe 16. FIG. 17 is an end view of the lead plates 142 and 144, taken along the arrow XVII in FIG. 10, and shows that the outer ends 142" and 144" of respective lead plates 142 and 144 are shaped in such a manner that these ends can be folded around the respective connecting wires in order to fix them.

Figure 18:
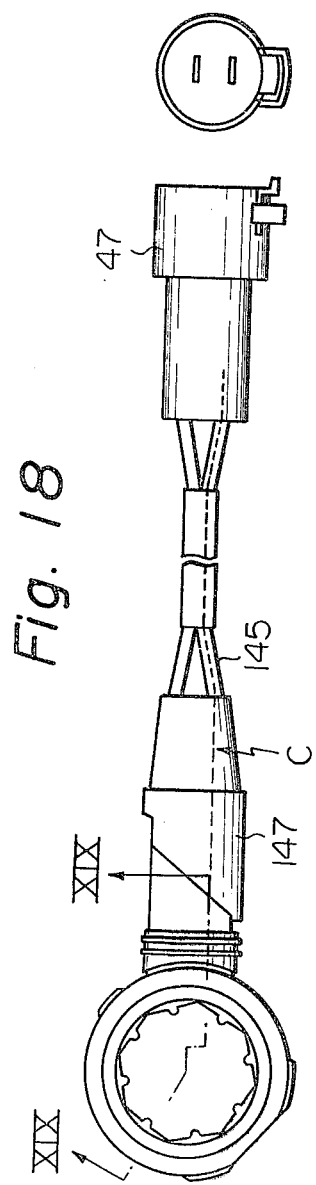
FIG. 18 is a top view of the outer pipe and the power supply connections, for illustrating the air flow.
Figure 19:
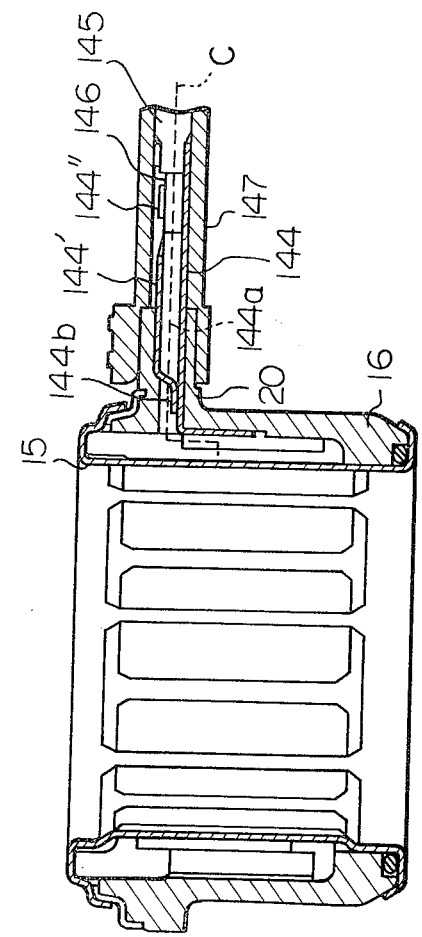
FIG. 19 is a sectional view taken along the line XIX—XIX in FIG. 18.

FIGS. 18 and 19 show an example of the connection between the positive and negative plates 142 and 144 and the connector 47, which preferably allows fresh air to flow to the enclosed area between the inner pipe 15 and the outer pipe 16, with other undesirable materials, such as water or oil, being excluded. The positive plate 144 is connected to the connecter 47 via a wire 145 which is composed of a bundle of thin electric conductive wires 146 and a plastic insulating tube surrounding the wires 146. One stripped end of the wire 145 is connected to the positive lead 144 by folding the end 144" of the positive plate 144, and the other stripped end of the wire 145 is connected to the terminal 46 (FIG. 9). The connecting area on the outer pipe 16 side is covered by rubber material 147, including the entire flange 20 and a part of the wire 145, so that no flow occurs through the rubber material 147. Thus, only the air flow which passes through the plastic tube surrounding the wires, is introduced into the interior of the outer pipe 16 through the holes 144a and 144b. This air flow is shown by the broken line C in FIGS. 18 and 19. Again, the fresh air comes in through the gaps of the connecter 47, flows through the plastic tube surrounding the wires between one cut end near the terminal 45 and the other cut end near the positive plate 144, enters into the enclosed area surrounded by the rubber material, and is introduced into the interior of the outer pipe 16 through the holes 144a and 144b. With this arrangement, only a certain amount of fresh air can be introduced inside the outer pipe 16, that is, into the enclosed area of the hollow heating vessel 14, and other undesirable materials, such as water or oil, can be prevented from entering therein. As a result of taking measurements, it was ascertained that the amount of air passing through the path C exceeded sixty cubic centimeters per minute.

The present invention is described as an exmaple of a positive lead having a tubular section, but it is apparent that the present invention can be applied to the negative plate having a similar tubular section.

As will be apparent from the foregoing description, according to the present invention, the intrusion of undesirable materials into the interior of the hollow heating vessel can be prevented while allowing a supply the fresh air to reach the PTC elements, whereby the characteristic property of the PTC elements can be maintained, which in turn produces an excellent internal combustion engine. The arrangement and the assembly work of the intake heating device can be further simplified.

While the invention has been described with reference to a specific embodiment chosen for the purpose of illustration, it should be apparent that numerous modifications could be made thereto by those skilled in the art without departing from the basic concept and scope of the claims of the present invention.

We claim:

1. An intake heating device of an internal combustion engine, which has a hollow heater vessel placed in an intake passage between the fuel supply means and a cylinder of the engine, said hollow heater vessel comprising an inner pipe having therein a mixture passage which is aligned with the intake passage, an outer pipe radially spaced from and surrounding said inner pipe, said inner and said outer pipes being coupled to each other so as to define an enclosed area therebetween, a plurality of PTC elements inserted in said enclosed area between said inner and said outer pipes, and power supply means for applying voltage between the inner walls and the outer walls of the said PTC elements, said power supply means comprising lead members which extend across the wall of said outer pipe, wherein the improvement comprises: said lead members being embedded integrally in said outer pipe in the course of the outer pipe casting; and at least one of said lead members having a tubular cross section which extends across the whole or a part of said outer pipe wall and along which a through hole can be provided for flowing a certain amount of air into said enclosed area.

2. An intake heating device according to claim 1, wherein said lead elements are formed in a plate-like manner having a high electric conductivity and at least one of said lead members is formed in a plate-like manner with its intermediate portion being molded in a tubular shape.

3. An intake heating device according to claim 2, wherein said plate-like leads are connected to the power source through respective lead wires covered with insulating tubes, and the respective outside ends of said plate-like leads are shaped in such a manner that said ends can be folded around said lead wires to fix them, when the plate-like leads are coupled to said lead wires.

4. An intake heating device according to claim 3, wherein a further insulating material is provided to cover hermetically a part of the outside wall of the outer pipe around the plate-like leads, the plate-like leads, and a part of the lead wires where the lead wires are covered with the insulating tubes, thereby allowing air to flow into said enclosed area only through the passage of the insulating tube surrounding the lead wire.

5. An intake heating device according to claim 1, wherein said lead members are two members which are placed side by side, generally perpendicular to the outer pipe axis.

* * * * *